US010035135B2

(12) United States Patent
Lee et al.

(10) Patent No.: US 10,035,135 B2
(45) Date of Patent: Jul. 31, 2018

(54) COMPOSITE HAVING METAL HYDROXIDE SUPPORTED ZEOLITE, AND WARM-MIX ASPHALT ADDITIVE CONTAINING THE SAME

(71) Applicant: University Of Ulsan Foundation For Industry Cooperation, Ulsan (KR)

(72) Inventors: Byeong-Kyu Lee, Ulsan (KR); Ajit Kumar Sharma, Ulsan (KR); Chi Hyeon Lee, Ulsan (KR)

(73) Assignee: University of Ulsan Foundation For Industry Cooperation, Ulsan (KR)

( * ) Notice: Subject to any disclaimer, the term of this patent is extended or adjusted under 35 U.S.C. 154(b) by 438 days.

(21) Appl. No.: 14/863,485

(22) Filed: Sep. 24, 2015

(65) Prior Publication Data
US 2016/0376418 A1 Dec. 29, 2016

(30) Foreign Application Priority Data

Jun. 29, 2015 (KR) ........................ 10-2015-0092227

(51) Int. Cl.
*B01J 23/78* (2006.01)
*C08K 3/34* (2006.01)
(Continued)

(52) U.S. Cl.
CPC ............... *B01J 23/78* (2013.01); *B01J 21/10* (2013.01); *C08K 3/22* (2013.01); *C08K 3/34* (2013.01);
(Continued)

(58) Field of Classification Search
CPC .. C08L 95/00; C08L 2555/00; C08L 2555/24; C08L 2555/50; C09D 195/00;
(Continued)

(56) References Cited

U.S. PATENT DOCUMENTS 5,064,794 A 11/1991 Drake
6,897,249 B2 * 5/2005 Kim ........................ C08L 95/00
524/68
(Continued)

FOREIGN PATENT DOCUMENTS

KR 10-1100415 12/2011
KR 10-1127763 2/2012

OTHER PUBLICATIONS

"Dendritic flower calcium hydroxide grown on aluminium substrate using polyacrylamide as a template". Jiang et al. Cryst. Res. Tech. 42, No. 7 673-677 (Year: 2007).*
(Continued)

*Primary Examiner* — Jennifer A Smith
*Assistant Examiner* — Alexandra M Moore
(74) *Attorney, Agent, or Firm* — Hammed & Associates, P.C.

(57) ABSTRACT

The composite of the present invention includes zeolite having a metal hydroxide supported thereon, and thus it can release moisture inside the zeolite effectively. Therefore, the warm-mix asphalt additive including the composite is not only economical but also able to lower with ease the temperatures required for mixing and compacting an asphalt mixture. Also, the asphalt mixture including the above-described warm-mix additive has a benefit of an improved adhesive strength, which leads to an excellent resistance to plastic deformation.

14 Claims, 3 Drawing Sheets

(51) Int. Cl.
  *C08L 95/00* (2006.01)
  *C08K 3/22* (2006.01)
  *B01J 21/10* (2006.01)
  *B01J 29/70* (2006.01)
  *B01J 23/02* (2006.01)
(52) U.S. Cl.
  CPC ............... *C08L 95/00* (2013.01); *B01J 23/02* (2013.01); *B01J 29/70* (2013.01); *C08K 2003/2206* (2013.01); *C08K 2003/2224* (2013.01); *C08L 2555/24* (2013.01); *C08L 2555/50* (2013.01)
(58) Field of Classification Search
  CPC . C09J 195/00; C10C 3/00; E01C 7/00; C08K 2003/2206; C08K 2003/2224; C08K 3/34; C08K 3/22; B01J 29/70; B01J 21/10; B01J 23/02; B01J 23/76; B01J 23/78
  See application file for complete search history.

(56) References Cited

U.S. PATENT DOCUMENTS

2006/0239906 A1* 10/2006 Mueller ................ C01B 37/005
  423/702
2013/0180431 A1* 7/2013 Myszak, Jr. ............ C08L 95/00
  106/283

OTHER PUBLICATIONS

Office Action dated Mar. 16, 2016 against the corresponding Korean Patent Application No. 10-2015-0092227 without an English Translation.
3rd Global Conference on Environmental Studies Programme, Apr. 30-May 2, 2015, Efes Surmeli Hotel, Kusadasi, Izmir, Turkey (2015).

* cited by examiner

[FIG. 1]
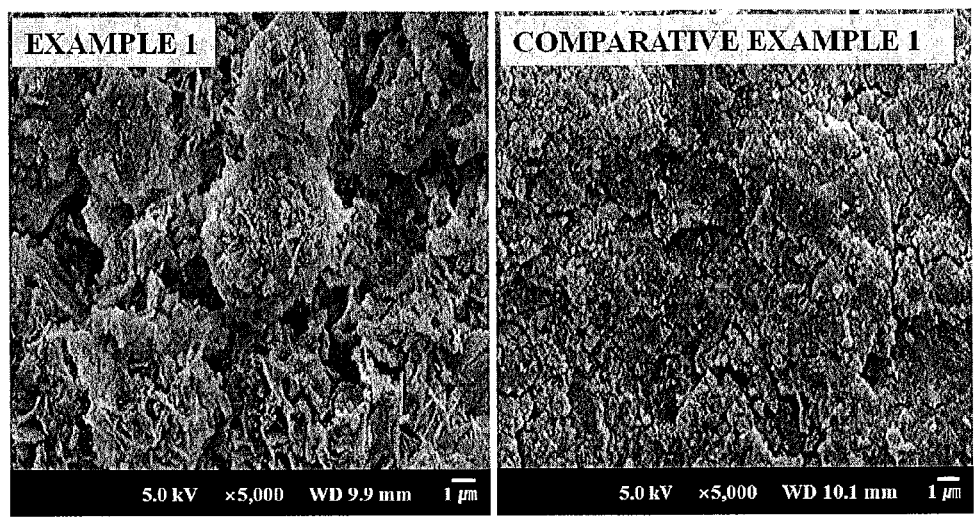

[FIG. 2]
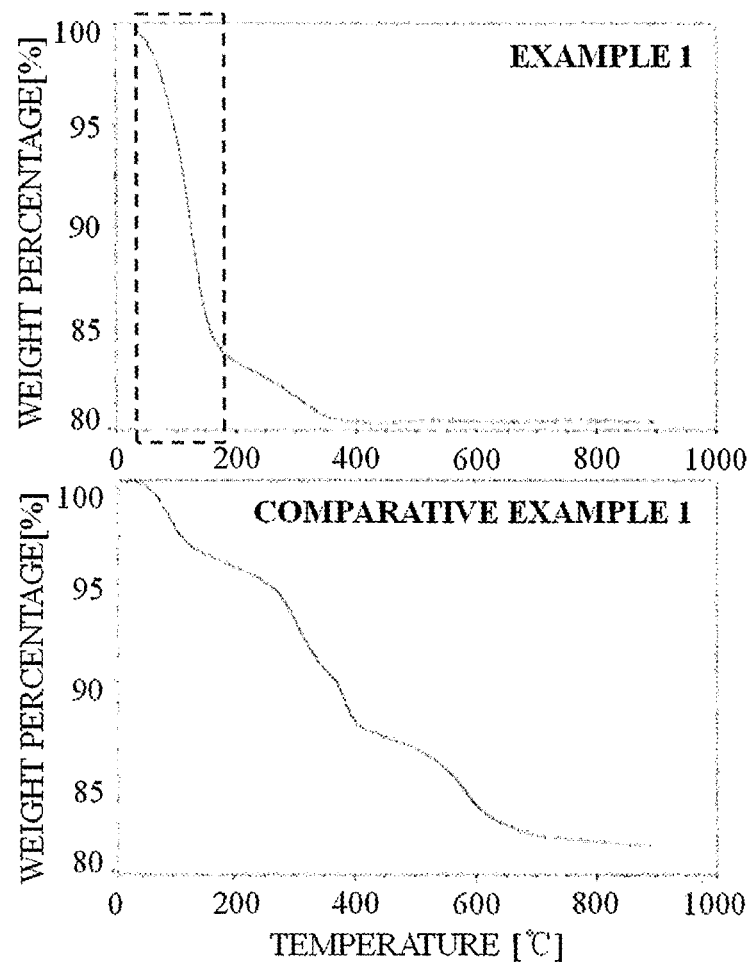

[Fig. 3]

COMPOSITE HAVING METAL HYDROXIDE SUPPORTED ZEOLITE, AND WARM-MIX ASPHALT ADDITIVE CONTAINING THE SAME

TECHNICAL FIELD

The present invention relates to a composite containing zeolite supported with a metal hydroxide and a warm-mix asphalt additive containing the composite.

BACKGROUND ART

Asphalt mixtures, generally referred to as ascon, are prepared through the operations in which asphalt, aggregates, mineral fillers, etc. are charged into an asphalt mixing plant and then heated to a high temperature of 160 to 180° C., and the mixtures later undergo cooling down to a room temperature while being applied and compacted on a road. Therefore, there have been problems associated with much energy required for heating to a high temperature and a large amount of harmful gases (e.g. carbon dioxide, sulfur oxides, nitrogen oxides, etc.) emitted during the preparation and application of asphalt mixtures. Also, there are problems in that much time is required for the high-temperature asphalt mixtures to cool down to a room temperature during road paving processes, thereby road openings are delayed and paving crew members are exposed to safety hazards for the duration.

In order to solve such problems, warm-mix asphalt mixtures (WMAs), which can be mixed and compacted at temperatures of 20 to 40° C. lower than those of the conventional hot-mix asphalt mixtures (HMAs), have been active areas of research recently.

For example, Patent Literature 1 discloses a technology related to a warm-mix additive containing a polyethylene wax and reformed fatty acid, and Patent Literature 2 discloses a technology related to a warm-mix additive containing a polyethylene wax and cellulose fibers.

The asphalt mixtures which are prepared from the above technologies using warm-mix additives based on a polyethylene wax have excellent high-temperature properties such as the resistance to plastic deformation; however, there are problems in that they become susceptible to cracking when exposed to an external shock under a low atmospheric temperature as in winter, thereby causing low-temperature cracking.

Therefore, being urgently needed is the development of an asphalt mixture, which is environmentally friendly and economical in such a way that it can be mixed and compacted at temperatures of 20 to 40° C. lower than those of the conventional HMAs, while having an excellent resistance to plastic deformation, thus being highly durable.

CITATION LIST

Patent Literature (Patent Literature 1) Korean Patent Registration No. 1100415
(Patent Literature 2) Korean Patent Registration No. 1127763

DISCLOSURE

Technical Problem

To solve such problems, the present invention is directed to providing an asphalt warm-mix additive, which can improve the resistance of an asphalt mixture to plastic deformation and, lower the mixing and compacting temperatures of the asphalt mixture economically.

The present invention is also directed to providing an asphalt mixture containing the warm-mix additive.

Technical Solution

To accomplish the above objectives;
in an exemplary embodiment, the present invention provides a composite which includes zeolite having a metal hydroxide supported thereon, and
when from 0° C. to 1000° C., satisfies the conditions in the Equation 1:

$$2 < WD_{150}/WD_{300} \leq 20 \qquad \text{[General equation 1]}$$

In General equation 1,
$WD_{150}$ represents a weight reduction ratio of the composite in a range of 50° C. to 150° C., and
$WD_{300}$ represents a weight reduction ratio of the composite in a range of 200° C. to 300° C.

Also, in an exemplary embodiment, the present invention provides a method of preparing the composite, wherein the method includes preparing zeolite having a metal oxide supported thereon from a mixture which includes a metal hydroxide, sodium hydroxide (NaOH) and sodium aluminate ($NaAlO_2$).

Further, an exemplary embodiment of the present invention provides a warm-mix asphalt additive including the above-described composite.

Also an exemplary embodiment of the present invention provides an asphalt mixture which includes asphalt and the above-described warm-mix asphalt additive.

Advantageous Effects

A composite according to the present invention includes zeolite having a metal oxide supported thereon and has a shape of a particle which can release the moisture inside the zeolite effectively, and thus a warm-mix asphalt additive including the composite is not only economical but also able to lower the mixing and compacting temperatures with ease. Also the addition of the warm-mix additive to the asphalt mixture can improve the adhesive strength, thus leading to an excellent resistance to plastic deformation.

DESCRIPTION OF DRAWINGS

FIG. 1 shows images captured by a scanning electron microscope (SEM) of a composite which was prepared in Example 1 according to the present invention and zeolite which was prepared according to Comparative Example 1.

FIG. 2 is a graph showing results of a thermogravimetric analysis of a composite which was prepared in Example 1 according to the present invention and zeolite which was prepared in Comparative Example 1.

FIG. 3 is an image showing a mixing temperature of an asphalt mixture according to the present invention.

MODE FOR INVENTION

While the exemplary embodiments of the present invention may be subjected to various modifications, only a few selected among the exemplary embodiments will be illustrated through drawings and described in detail hereinafter.

However, there is no intention to limit the present invention to a particular embodiment, and it should be understood that the scope of the present invention encompasses all modifications, equivalents or alterations made within the spirit and scope of the present invention.

In describing the present invention, it will be understood that the terms such as "contain", "containing", "include", "including", "comprise", "comprising", "have" and "having" specify that the features, numbers, steps, operations, elements, components and/or combinations thereof disclosed herein are present, but the terms do not preclude the possibility that one or more other features, numbers, steps, operations, elements, components and/or combinations thereof are also present in or can be introduced into the scope of the present invention.

Also, the drawings provided for the present invention may have been illustrated enlarged or reduced for the convenience of explanation.

Hereinafter, embodiments of the present invention will be described in detail with reference to the accompanying drawings, like reference numerals will be used for like elements even in different drawings, and redundant descriptions thereof will be omitted.

In describing the present invention, "a dendritic particle structure" refers to a structure formed by zeolite having a metal hydroxide supported thereon grown and/or agglomerated into an arborescent skeleton around the nucleus. The surface coverage thereon may be in the form of leaf-like or flower-like grains.

Also in describing the present invention, "an amorphous particle structure" refers to a structure which has uniformity in composition but lacks a periodic regularity in the arrangement of atoms or molecules.

Further, in describing the present invention, "zeolite" refers to a nanometer-scale zeolite having an average particle diameter of less than 1 μm, preferably, less than 1000 nm, no more than 500 nm, or no more than 300 nm, and it can be used interchangeably with "a nano-zeolite."

The present invention relates to a composite including zeolite having a metal hydroxide supported thereon and a warm-mix asphalt additive including the composite.

Asphalt mixtures are conventionally prepared through the processes in which the mixtures containing asphalt, aggregates, mineral fillers, etc. are heated to a high temperature of 160 to 180° C. Such a heating process not only requires much energy for heating the materials to a high temperature but also emits a large amount of harmful gases such as carbon dioxide, sulfur oxides, nitrogen oxides, etc. Moreover, much time is required for the high-temperature asphalt mixtures to cool down to a room temperature during road paving processes, thereby road openings are delayed and paving crew members are exposed to safety hazards for the duration. In order to solve such problems, research has been made on a variety of warm-mix asphalt additives; however, such technologies which are economical while effectively lowering the mixing and compacting temperatures of asphalt mixtures and improving the durability of the mixtures have yet to be developed.

The present invention hereby provides a composite and a warm-mix asphalt additive containing the same.

Including zeolite having a metal oxide supported thereon and thereby having a shape of a particle, a composite of the present invention which includes zeolite having a metal oxide supported thereon can release moisture inside the zeolite effectively; therefore, a warm-mix asphalt additive including the composite is not only economical but also able to the lower the mixing and compacting temperatures with ease. Also by including the above-described warm-mix additive, an asphalt mixture has a benefit of an improved adhesive strength, which leads to an excellent resistance to plastic deformation.

Hereinafter, the present invention will be described in further detail.

The present invention in an exemplary embodiment; provides a composite which includes zeolite having a metal hydroxide supported thereon, and when thermogravimetry is performed at 0° C. to 1000° C., satisfies the conditions in the following General equation 1:

$$2 < WD_{150}/WD_{300} \leq 20 \qquad \text{[General equation 1]}$$

In General equation 1, $WD_{150}$ represents the weight reduction ratio of the composite in a range of 50° C. to 150° C., and $WD_{300}$ represents the weight reduction ratio of the composite in a range of 200° C. to 300° C.

Zeolites generally have a three-dimensional structure in which each of silicon (Si) and aluminum (Al) is combined with oxygen (O), and therefore, they have high compressive strengths. Also, the zeolites in general have pores, thus having a characteristic of accommodating water inside the structure. A composite of the present invention contains the above zeolite supported with a metal hydroxide, wherein the metal hydroxide can alter the properties of the crystal surface of the zeolite; therefore, the composite has a dendritic particle structure with a large surface area, and accordingly, is capable of giving off a significant amount of the moisture inside the zeolite structure even in a range of low temperatures. In particular, the above composite can effectively release the moisture contained therein within a temperature range of approximately 50 to 180° C.; therefore, the rate by which the weight of the composite decreased during a thermogravimetric analysis (TGA) in a temperature range of 50 to 180° C. may be 2 to 20 times, 3 to 15 times, 5 to 10 times, or 4 to 8 times higher than the rate at temperatures of 180° C. or above. In one example of the present invention, the results of TGA performed on a composite by elevating the temperature from 0 to 1000° C. at a rate of 10° C./min confirmed that the rate by which the weight of the composite decreased was approximately 15% within a range of 50 to 150° C. and approximately 2.5% within a range of 200 to 300° C. This indicates that the rate by which the weight of the composite decreased is approximately 6 times higher within the range of 50 to 150° C., and thus the conditions in Equation 1 are satisfied (refer to Experimental Example 3).

In this case, the particle structure of the above composite is not limited to a particular shape as long as it has a large surface area, but it may be dendritic, in particular, as the zeolite having a metal hydroxide supported thereon has grown and/or agglomerated into an arborescent skeleton. Here, the average particle diameter of the zeolite having a metal hydroxide supported thereon may be in the range of 10 to 200 nm, preferably, 10 to 150 nm, 50 to 150 nm, or 80 to 120 nm. Also, the average particle diameter of the composite in which the above zeolite has grown and/or agglomerated may be in the range of 1 to 10 μm, preferably, 2 to 10 μm, 3 to 9 μm, or 4 to 7 μm (see Experimental Example 1).

Further, a metal hydroxide which is supported in zeolite is not limited to a particular type, as long as it is a Group II metal containing a hydroxide (OH) group. For example, the above metal hydroxide may be one or more types selected from the group consisting of calcium hydroxide ($Ca(OH)_2$), magnesium hydroxide ($Mg(OH)_2$) and barium hydroxide ($Ba(OH)_2$), and preferably, calcium hydroxide ($Ca(OH)_2$). The above calcium hydroxide ($Ca(OH)_2$) can alter the properties of the crystal surface of the zeolite, thus resulting in the formation of a dendritic composite having a large surface area.

In this case, the content of the above metal hydroxide may be 10 to 50 parts by weight with respect to 100 parts by weight of the zeolite, preferably, 10 to 35 parts by weight, 15 to 45 parts by weight, 20 to 40 parts by weight or 25 to 35 parts by weight with respect to 100 parts by weight of the zeolite.

With this, the composite may further include 0.1 to 30 parts by weight of water with respect to the total weight of the composite. A composite of the present invention may contain water inside the pores of the zeolite, and in this case, the water content inside the pores may be 0.1 to 30 parts by weight, 0.1 to 25 parts by weight or 0.1 to 20 parts by weight with respect to the total weight of the composite. In the present invention, the water content inside the pores is adjusted so that it falls within the above range; therefore, referring to the present invention, one can lower with ease the temperatures required for the mixing and compacting operations of an asphalt mixture to approximately 110 to 130° C. and prevent water from remaining inside the asphalt mixture (which is cured after the above operations) and causing degradation in the durability of the asphalt mixture.

Also, in an exemplary embodiment of the present invention, a method of preparing a composite is provided, wherein the method includes preparing zeolite having a metal hydroxide supported thereon from a mixture including a metal hydroxide, sodium hydroxide (NaOH) and sodium aluminate ($NaAlO_2$).

The method of preparing a composite according to the present invention is based on a sol-gel reaction. Zeolite is prepared through a sol-gel reaction between a silica sol and a mixture including sodium hydroxide (NaOH) and sodium aluminate ($NaAlO_2$). In this case, when a metal hydroxide is mixed with the above-described mixture, zeolite having a metal hydroxide supported thereon can be obtained.

In particular, the above-described preparing of zeolite may include aging a mixture including a metal hydroxide, sodium hydroxide (NaOH) and sodium aluminate ($NaAlO_2$) and then, mixing the aged mixture with a silica sol.

Also, the above-described mixing of the silica sol may be performed at 150 to 200° C., and preferably at 170 to 190° C.

Further, an exemplary embodiment of the present invention provides a warm-mix asphalt additive which contains a composite having zeolite supported with a metal hydroxide.

Warm-mix asphalt technologies lower the temperatures required for the production and application of asphalt mixtures by 20 to 40° C. compared to those of the conventional asphalt mixtures, and are the methods by which the amount of harmful gases emitted during paving processes can be reduced. One among the conventional warm-mix asphalt technologies is a foamed method which applies a foamed effect that takes place between the asphalt and moisture. High-pressure foaming equipment is necessitated for the above method, and thus additional investment costs are required. However, the warm-mix asphalt additive of the present invention contains a composite which, containing zeolite supported with a metal oxide, has a dendritic particle structure, and thus can release a significant amount of the moisture contained even in the range of low temperatures, thus inducing a foamed effect between the asphalt materials.

For example, the warm-mix asphalt additive of the present invention satisfies the conditions in Example 1 below when analyzed by TGA from 0° C. to 1000° C., and accordingly, the mixing and compacting temperatures of the asphalt mixture can be lowered to approximately 110 to 130° C. (FIG. 3):

$$2 < WD_{150}/WD_{300} \leq 20 \qquad \text{[Equation 1]}$$

In Equation 1 above, $WD_{150}$ refers to the rate by which the weight of the additive decreased in a range of 50° C. to 150° C., and $WD_{300}$ refers to the rate by which the weight of the additive decreased in a range of 200° C. to 300° C.

With this, the present invention provides, in an exemplary embodiment, asphalt and an asphalt mixture containing the above warm-mix asphalt additive of the present invention.

The asphalt mixtures of the present invention contain the above warm-mix asphalt additive as well as asphalt; therefore, the mixing and compacting temperatures of the asphalt mixture can be lowered with ease and the properties can be improved in terms of Marshall stability (which is required for the application of an asphalt mixture, and in particular, for road paving processes), flow ability, porosity, density, saturation, etc.

For example, when the asphalt mixtures containing a warm-mix asphalt additive according to the present invention and the asphalt mixtures containing zeolite as the warm-mix additive were measured for their mixing temperatures, the results confirmed that the mixing temperatures of the asphalt mixtures of the present invention (Example 4) ranged from approximately 110 to 130° C., whereas the mixing temperatures of the asphalt mixtures containing the zeolite of Comparative Example 1 as the warm-mix additive ranged from approximately 146 to 160° C.

In another example, the asphalt mixture of the present invention shows improvement in Marshall stability, density, etc. When stability was evaluated following the test guidelines of KSF (Korean Standards F; KS F) 2349, the average Marshall stability may range from 7000 to 10000 N, preferably, from 7300 to 9700 N or from 7500 to 9500 N. Also, the density may range from 1.5 to 3 g/cm³ or from 2 to 2.5 g/cm³.

Here, the content of the warm-mix asphalt additive contained in the above asphalt mixture may be selected within the range in which the mixing and compacting temperatures of the asphalt mixture can be lowered. Preferably, it is 1 to 10 parts by weight with respect to 100 parts by weight of asphalt, and more preferably, it is 2 to 8 parts by weight or 2.5 to 7 parts by weight with respect to 100 parts by weight of asphalt. In the present invention, the content of the warm-mix asphalt additive is adjusted so that it falls in the above range; therefore, the mixing and compacting temperatures of the asphalt mixtures can be lowered and economic feasibility can be increased.

Hereinafter, the present invention will be described in further detail through Examples and Experimental Examples.

However, the Preparation Examples and Experimental Examples below are provided to merely illustrate the present invention; the scope of the present invention should not be limited to Preparation Examples and Experimental Examples below.

Example 1

Calcium hydroxide ($Ca(OH)_2$, 4.375 g), sodium hydroxide (NaOH, 4.375 g) and sodium aluminate ($NaAlO_2$, 1.837 g) were dissolved in distilled water (625 mL) to form a liquid mixture, which was aged for 5 hours, to which a silica sol (82.5 g) was added dropwise, and then stirred at room temperature for 5 hours. Later, the uniform mixture was heated at 180° C. for 24 hours and then stirred. Solid products were separated by centrifugation, then washed with distilled water until the pH reaches 7, and dried at 80° C. for 10 hours so that a composite was obtained. In this case, the content of the calcium hydroxide in the composite was 30 parts by weight with respect to 100 parts by weight of the zeolite.

Examples 2 to 6

A mixture of calcium carbonate and aggregates (e.g. crushed stones, slag and gravel) was mixed with asphalt in a ratio of 95 parts by weight:5 parts by weight, and then the composite prepared in Example 1 was added to the mixture as a warm-mix asphalt additive. In this case, the mixing temperature of the mixture containing the warm-mix additive was approximately 119±1° C. (FIG. 3), and the added amounts of the composite are summarized in Table 1 below.

TABLE 1

|  | Amounts added [based on 100 parts by weight of an asphalt] |
| --- | --- |
| Example 2 | 2 parts by weight |
| Example 3 | 3 parts by weight |
| Example 4 | 4 parts by weight |
| Example 5 | 5 parts by weight |
| Example 6 | 6 parts by weight |

Comparative Example 1

Zeolite which is not supported with a metal hydroxide was synthesized in the same manner as in Example 1, except that sodium hydroxide and sodium aluminate, instead of all of calcium hydroxide, sodium hydroxide and sodium aluminate, were dissolved in distilled water.

Experimental Example 1

In order to evaluate the particle shape and average particle diameter of the composite of the present invention, scanning electron microscope (SEM) imaging was performed on a composite containing the zeolite of Example 1, which is supported with calcium hydroxide, as well as on the zeolite of Comparative Example 1 which is not supported with calcium hydroxide, and the results are provided in FIG. 1.

As shown in FIG. 1, having zeolites with an average particle diameter of 90 to 110 nm agglomerated in the structure, the composite of Example 1 was found to have an average particle diameter of approximately 4 to 6 μm and a dendritic particle structure with a large surface area. In contrast, the zeolite of Comparative Example 1 was found to have amorphous particles which were irregularly agglomerated into one mass-like shape. The results indicate that, with the composite of Example 1 containing the zeolite supported with calcium hydroxide, there had been changes in the characteristics of the crystal face which determine the ways the crystals grow and/or agglomerate.

Based on the results, it can be seen that, by containing zeolite supported with a metal hydroxide, the composite of the present invention has a dendritic particle structure with a large surface area.

Experimental Example 2

In order to evaluate the degree of moisture loss as a function of the temperature of the composite of the present invention, TGA was performed on the composite of Example 1, which contains zeolite supported with calcium hydroxide, as well as on the zeolite of Comparative Example 1, which does not contain calcium hydroxide. In this case, TGA was performed in a nitrogen gas atmosphere using a TGA instrument and the temperature was elevated from 0° C. to 1000° C. at a rate of 10° C./min, and the results are provided in FIG. 2.

Referring to FIG. 2, the weight of the composite of Example 1 was found to have a sharp decrease within the range of approximately 50 to 180° C. until it reached approximately 85% of the initial weight. Later, the weight was found to have further decreased by approximately 5% within the range of 180 to 400° C., and the weight stayed unchanged from 400° C. to 1000° C. In contrast, the weight of the zeolite of Comparative Example 1 decreased from approximately 50 to 800° C., but the way it decreased was irregular. These indicate that the composite of Example 1 releases the moisture inside the composite structure effectively within a single temperature range of 50 to 180° C.

Based on the results, it can be seen that, by containing zeolite supported with a metal hydroxide, the composite of the present invention has a dendritic particle structure with a large surface area, and thus it can release the moisture inside effectively within a single temperature range.

Experimental Example 3

In order to evaluate the properties of the asphalt mixture according to the present invention, the asphalt mixtures of Examples 2 to 6 were measured for Marshall stability (following KS F 2349), flow rate volume, air voids, saturation, density, and voids in mineral aggregate. The results are provided in Table 2 below, along with the quality standards of KS F 2349 for the asphalt mixtures for surface courses.

TABLE 2

|  | Example 2 | Example 3 | Example 4 | Example 5 | Example 6 | Quality standards |
| --- | --- | --- | --- | --- | --- | --- |
| Stability [N] | 7572 ± 50 | 8825 ± 50 | 9375 ± 50 | 8717 ± 50 | 9391 ± 50 | >5000 |
| Flow rate volume [1/100 cm] | 30 ± 2 | 32 ± 2 | 32 ± 2 | 31 ± 2 | 34 ± 2 | 20~40 |
| Air voids [%] | 6.7 ± 0.2 | 5.8 ± 0.2 | 5.4 ± 0.2 | 5.3 ± 0.2 | 5.1 ± 0.2 | 3~6 |
| Saturation [%] | 65 ± 4 | 68 ± 4 | 70 ± 4 | 70 ± 4 | 71 ± 4 | 65~80 |
| Density [g/cm$^3$] | 2.28 ± 0.1 | 2.304 ± 0.1 | 2.31 ± 0.1 | 2.315 ± 0.1 | 2.319 ± 0.1 | — |
| Voids in mineral aggregate [%] | 19 ± 1 | 18 ± 1 | 18 ± 1 | 18 ± 1 | 18 ± 1 | >14 |

Referring to Table 2, it can be seen that the asphalt mixtures prepared in Examples 2 to 6 meet the quality standards. In particular, the flow rate volume, air voids and saturation of the asphalt mixtures prepared in Examples 2 to 6 were found to fall within the standard ranges. Also, the voids in mineral aggregate were found to be approximately 18% or more, and especially, Marshall stability representing the load at destruction of a cured asphalt mixture under loading was notably excellent at approximately 7550 N or more. This indicates that the adhesive strength of the asphalt mixtures of Examples 2 to 6 has improved due to the large surface area of the warm-mix asphalt additives which are contained in the asphalt mixtures.

Based on the results, it can be seen that, being contained in an asphalt mixture, the warm-mix asphalt additive is able to not only lower the mixing and compacting temperatures but also improve the resistance plastic deformation of the asphalt mixture which was compacted and cured.

By containing zeolite which is supported with a metal hydroxide, the composite of the present invention can release the moisture inside the zeolite structure effectively; therefore, a warm-mix additive containing the composite is not only economical but also can lower the mixing and compacting temperatures of an asphalt mixture with ease. Also, an asphalt mixture containing the above warm-mix additive has a benefit of an improved adhesive strength which leads to an excellent resistance to plastic deformation.

The invention claimed is:

1. A composite comprising zeolite having a metal hydroxide supported thereon,
   the metal hydroxide is at least one selected from the group consisting of calcium hydroxide ($Ca(OH)_2$), magnesium hydroxide ($Mg(OH)_2$) and barium hydroxide ($Ba(OH)_2$),
   the metal hydroxide has a content of 10 to 50 parts by weight with respect to 100 parts by weight of the zeolite;
   the composite has a form of a particle of a dendritic type in which the zeolite having the metal hydroxide supported thereon is aggregated into an arborescent skeleton; and
   when thermogravimetry is performed at 0° C. to 1000° C., satisfying conditions of the following General equation 1:

$$2 < WD150/WD300 \leq 20 \qquad \text{[General equation 1]}$$

wherein, in General equation 1,
   WD150 represents a weight reduction ratio of the composite in a range of 50° C. to 150° C., and WD300 represents a weight reduction ratio of the composite in a range of 200° C. to 300° C.

2. The composite of claim 1, wherein the zeolite has an average particle diameter of 10 to 200 nm.

3. The composite of claim 1, wherein the metal hydroxide has a content of 10 to 50 parts by weight with respect to 100 parts by weight of the zeolite.

4. The composite of claim 1 further comprising water at 0.1 to 30 parts by weight with respect to a total weight of the composite.

5. The composite of claim 1, wherein the composite has an average particle diameter of 1 to 10 μm.

6. A method of preparing the composite according to claim 1, the method comprising preparing zeolite having a metal hydroxide supported thereon from a mixture including a metal hydroxide, sodium hydroxide (NaOH) and sodium aluminate ($NaAlO_2$).

7. The method of claim 6, wherein the preparing of the zeolite includes aging a mixture including a metal hydroxide, sodium hydroxide (NaOH) and sodium aluminate ($NaAlO_2$) and mixing a silica sol with the aged mixture.

8. The method of claim 7, wherein the mixing of the silica sol is performed at 150° C. to 200° C.

9. A warm-mix asphalt additive comprising a composite according to claim 1.

10. The warm-mix asphalt additive of claim 9, wherein, when thermogravimetry is performed at 0° C. to 1000° C., conditions in the following General equation 1 are satisfied:

$$2 < WD150/WD300 \leq 20 \qquad \text{[General equation 1]}$$

wherein, in General equation 1,
    WD150 represents a weight reduction ration of the additive in a range of 50° C. to 150° C.,
    and WD300 represents a weight reduction ratio of the additive in a range of 200° C. to 300° C.

11. An asphalt mixture comprising asphalt and the warm-mix asphalt additive according to claim 9.

12. The asphalt mixture of claim 11, wherein the warm-mix additive has a content of 1 to 10 parts by weight with respect to 100 parts by weight of the asphalt.

13. The asphalt mixture of claim 11, wherein average Marshall stability is 7000 to 10000 N when stability is evaluated according to KSF 2349.

14. The asphalt mixture of claim 11, wherein the asphalt mixture has a mixing temperature in a range of 110° C. to 130° C.

* * * * *